US012756199B2

(12) United States Patent
Kumar et al.

(10) Patent No.: US 12,756,199 B2
(45) Date of Patent: Oct. 6, 2026

(54) DIGITAL TRACER FOR WELL BEHAVIOR IDENTIFICATION

(71) Applicant: SAUDI ARABIAN OIL COMPANY, Dhahran (SA)

(72) Inventors: Sanjiv Kumar, Udhailiyah (SA); Mohammed A. Al-Abdulhay, Ahsa (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 525 days.

(21) Appl. No.: 18/304,553

(22) Filed: Apr. 21, 2023

(65) Prior Publication Data

US 2024/0356337 A1 Oct. 24, 2024

(51) Int. Cl.
*H02J 3/38* (2026.01)
*E21B 43/12* (2006.01)
*H02J 101/10* (2026.01)

(52) U.S. Cl.
CPC ............ *H02J 3/381* (2013.01); *E21B 43/121* (2013.01); *H02J 2101/10* (2026.01)

(58) Field of Classification Search
CPC ...... H02J 3/381; H02J 2300/10; E21B 43/121
See application file for complete search history.

(56) References Cited

U.S. PATENT DOCUMENTS

| | | | | |
|---|---|---|---|---|
| 2016/0265300 A1* | 9/2016 | Affleck | .................... | E21B 33/06 |
| 2018/0094519 A1* | 4/2018 | Stephens | ............... | E21B 47/007 |
| 2018/0100374 A1* | 4/2018 | Al-Dossary | ............. | E21B 33/03 |
| 2018/0262127 A1* | 9/2018 | Gooneratne | ......... | G01V 11/002 |
| 2019/0226296 A1* | 7/2019 | Rakhunde | ........... | E21B 33/0355 |

* cited by examiner

*Primary Examiner* — Charles Cai

(74) *Attorney, Agent, or Firm* — Osha Bergman Watanabe & Burton LLP

(57) ABSTRACT

A system includes a flow line, a conduit, a turbine, an energy generator, and a chip. The flow line has an outer circumferential surface and an inner circumferential surface and connected to the well. The conduit is delineated by the inner circumferential surface of the flow line. The turbine is disposed in the conduit of the flow line and configured to convert kinetic energy of a fluid, flowing from the well through the conduit, to rotational movement. The energy generator is connected to the turbine and is configured to convert the rotational movement to electrical energy. The chip is connected to the energy generator and configured to use the electrical energy created by the energy generator to send a signal indicating an operational status of the well to a receiver.

16 Claims, 5 Drawing Sheets

DIGITAL TRACER FOR WELL BEHAVIOR IDENTIFICATION

BACKGROUND

In the petroleum industry, hydrocarbons are located in reservoirs far beneath the Earth's surface. Wells are drilled into these reservoirs to access and produce the hydrocarbons. To effectively produce the entirety of the reservoir, multiple wells may be strategically drilled into the reservoir. Furthermore, multiple reservoirs may be produced from in a geographical area. Wells may also be located in remote locations with little existing infrastructure. It is important for an operator to be aware of the operating status of wells in their geographical area in order to analyze hydrocarbon production data, check the integrity of the fluid transport system, plan workover operations, and plan abandonment operations. Due to the lack of infrastructure, energy conservation initiatives, and volume of wells, tracking the operating status of each well can be difficult.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

This disclosure presents, in accordance with one or more embodiments methods and systems for a well. The system includes a flow line, a conduit, a turbine, an energy generator, and a chip. The flow line has an outer circumferential surface and an inner circumferential surface and connected to the well. The conduit is delineated by the inner circumferential surface of the flow line. The turbine is disposed in the conduit of the flow line and configured to convert kinetic energy of a fluid, flowing from the well through the conduit, to rotational movement. The energy generator is connected to the turbine and is configured to convert the rotational movement to electrical energy. The chip is connected to the energy generator and configured to use the electrical energy created by the energy generator to send a signal indicating an operational status of the well to a receiver.

The method includes connecting a flow line having an outer circumferential surface and an inner circumferential surface to the well and disposing a turbine within a conduit of the flow line. The conduit is delineated by the inner circumferential surface of the flow line. The method further includes connecting an energy generator to the turbine and a chip to the energy generator and sending a signal from the chip to a receiver by converting kinetic energy of a flow of fluid through the conduit to rotational movement of the turbine and converting the rotational movement to electrical energy using the energy generator. The signal indicates an operational status of the well.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Figure 1:
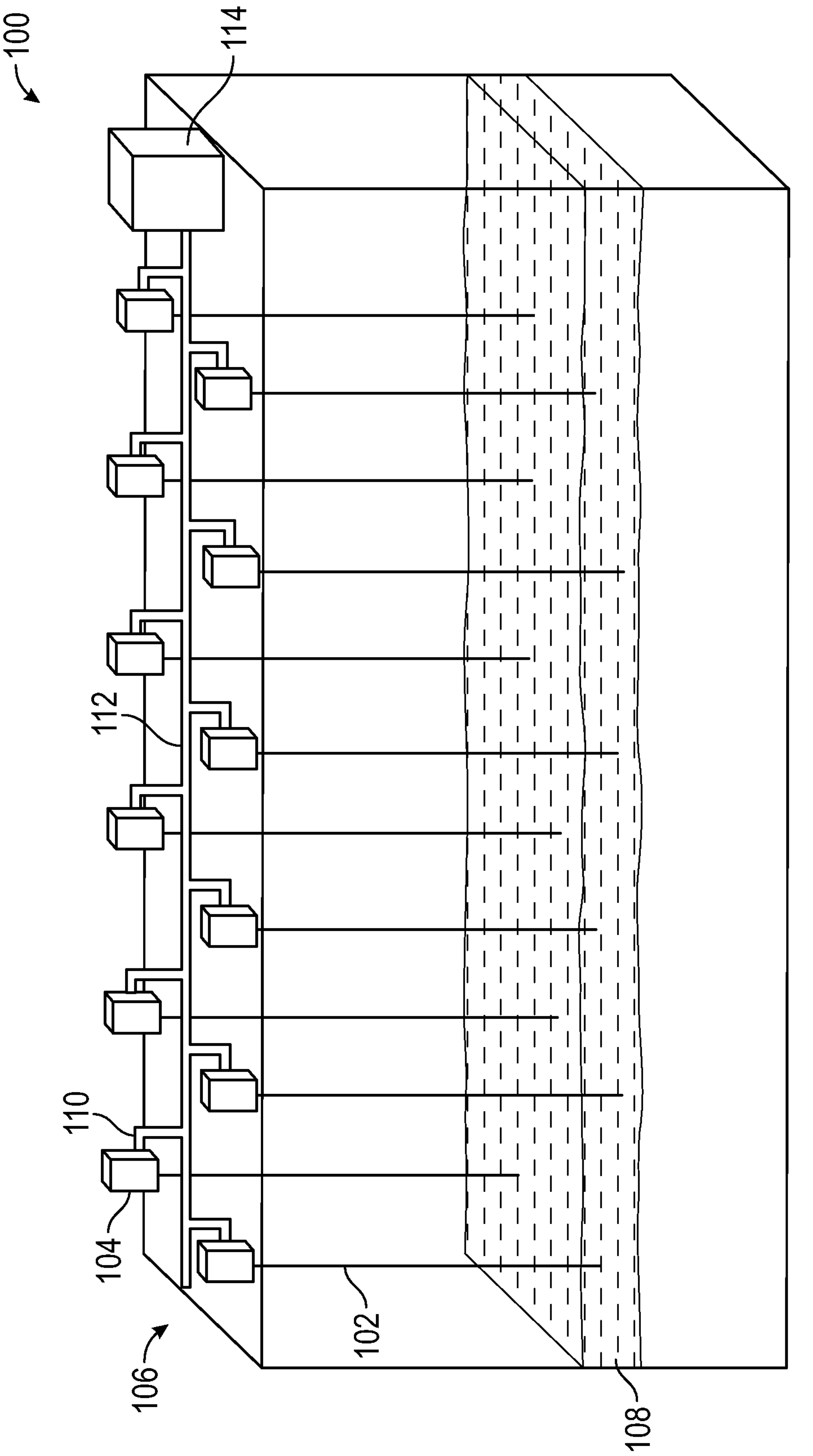
FIG. 1 shows a field in accordance with one or more embodiments.

FIG. 1 shows a field (100) in accordance with one or more embodiments. The particular field (100) shown is for illustration purposes only; the scope of this disclosure is intended to encompass any type of field (100) or any number of wells (102). In accordance with one or more embodiments, a field (100) is a geographical region or location that includes one or more wells (102). The field (100) may include the wells' surface equipment, such as production trees (104), and other production equipment such as pipelines, tanks, separators, etc. Each well (102) extends from a surface location (106) into a reservoir (108). The surface location (106) may be any location on/above the Earth's surface. In accordance with one or more embodiments, the field (100) is delineated by the wells (102) that are near to each other geographically.

The reservoir (108) is a formation containing fluids intended to be produced, such as oil, gas, and/or water. The wells (102) shown in FIG. 1 are vertical conventional wells; however, those skilled in the art will appreciate that the wells in the field (100) may have any wellbore trajectory, such as horizontal, without departing from the scope of this disclosure herein. FIG. 1 shows the field (100) having 12 wells (102) each with a production tree (104). However, the field (100) may have any number of wells (102) without departing from the scope of this disclosure herein.

FIG. 1 further outlines a pipeline system for the field (100) of wells (102). In particular, each well (102) has a flow line (110) that transports the produced fluids away from the well (102). Each flow line (110) transports the produced fluids to a gathering piping network (112). FIG. 1 shows the gathering piping network (112) as a singular pipeline; however, any number of pipelines may be used to form the gathering piping network (112) without departing from the scope of the disclosure herein. In accordance with one or more embodiments, the gathering piping network (112) transports the produced fluids to a production plant (114).

A production plant (114) is a location or a series of locations where the produced fluids are prepared to be further transported from the field (100). For example, the production plant (114) may include equipment used to separate the produced fluids into water, gas, and crude oil. The production plant (114) may further include computer systems, safety equipment, or other auxiliary equipment needed to prepare the produced fluids for further transport.

Figure 2:
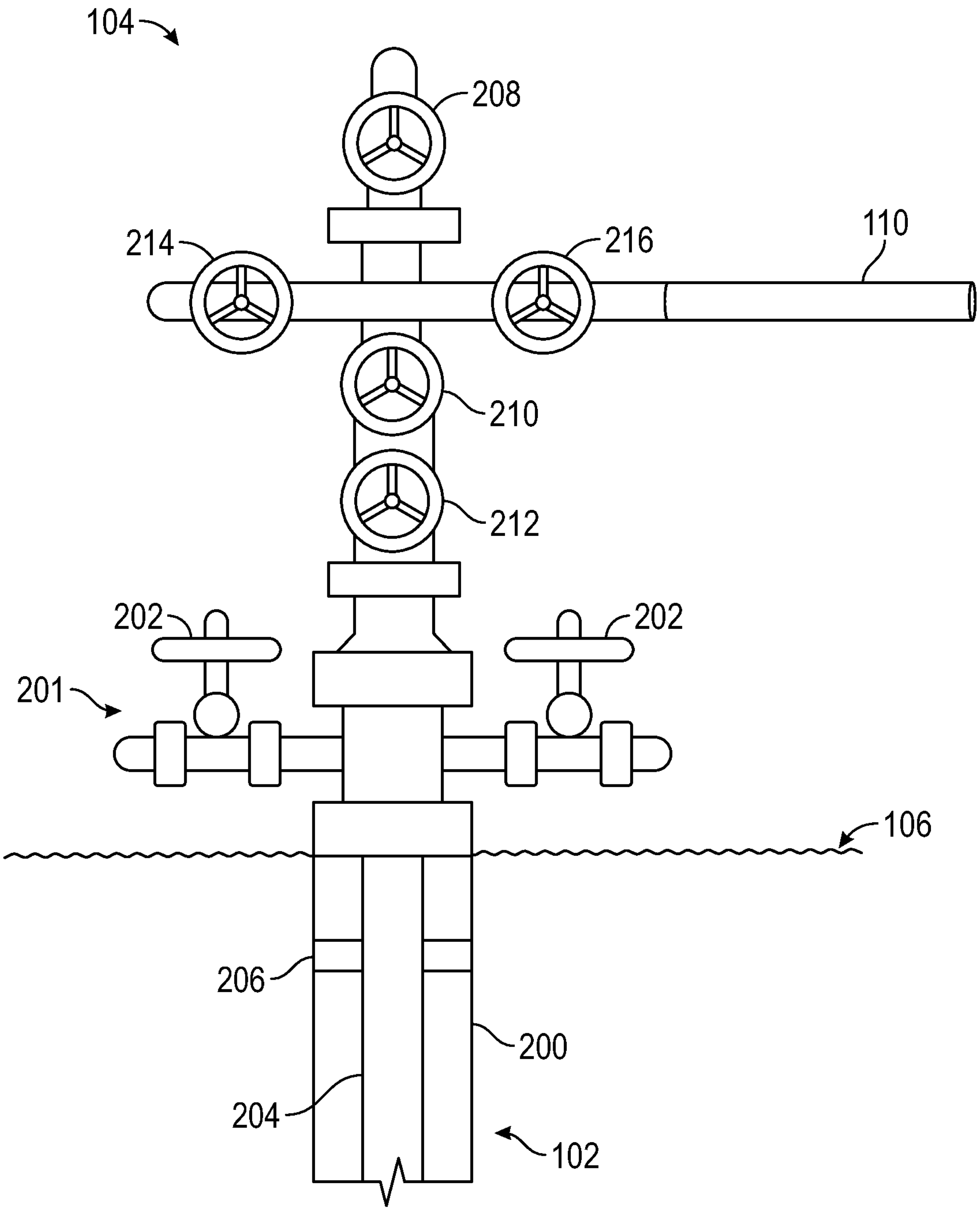
FIG. 2 shows a production tree caping a well in accordance with one or more embodiments.

FIG. 2 shows a production tree (104) capping a well (102) in accordance with one or more embodiments. Components shown in FIG. 2 that are the same as or similar to components shown in FIG. 1 have not been redescribed for purposes of readability and have the same function and description as outlined above.

The particular structure shown is for illustration purposes only; the scope of this disclosure is intended to encompass any type of production tree (104). In general, the production tree (104), also known as a Christmas tree, is installed on top of a wellhead (201). The production tree (104) and the wellhead (201) cap the well (102) at a surface location (106). The well (102) may have any wellbore geometry and structure without departing from the scope of the disclosure herein.

The well (102) is structurally supported by one or more casing (200) strings. The wellhead (201) is made of a plurality of spools and wellhead valves (202). The surface-extending portion of each casing (200) string is housed in the wellhead (201). The casing (200) string(s) extend from the wellhead (201) into the hole and are cemented in place.

In accordance with one or more embodiments, a tubing head (not pictured), housing the surface-extending portion of production tubing (204), may be located between the wellhead (201) and the production tree (104). The production tubing (204) is located within the inner-most casing string and is often set in tandem with a packer (206). The production tubing (204) provides a conduit for production fluids to flow up hole to the surface location (106). The packer (206) seals the tubing-casing annulus and forces the production fluids to flow into the production tubing (204). A person skilled in the art will readily appreciate that the well (102) may have other completion designs and may include other pieces of equipment, such as artificial lift equipment or liners, without departing from the scope of the disclosure herein.

The wellhead valves (202) provide access to the annuli located between casing (200) strings or between a casing (200) string and the wellbore wall. The wellhead valves (202) may be any valve known in the art, such as a gate valve. The production tree (104) is also made of a plurality of spools and valves. The production tree (104) valves may also be any valve known in the art, such as a gate valve. Often the production tree (104) is formed in a T-shape as shown in FIG. 2. The production tree (104), depicted in FIG. 2, has a crown valve (208), an upper master valve (210), a lower master valve (212), a kill wing valve (214), and a production wing valve (216). However, the production tree (104) may have any combination of valves without departing from the scope of the disclosure herein.

In accordance with one or more embodiments, the lower master valve (212) is a gate valve and may be used to limit the amount of flow into the production tree (104) from the wellhead (201). In most cases, it is manually actuated and kept in a restricted, partially open position during production of formation fluids. The upper master valve (210) is a failsafe measure in case the lower master valve (212) fails or if maintenance on the production tree (104) must be performed. The upper master valve (210) is often a remotely actuated gate valve and may be automatically shut to prevent all flow from the wellhead (201) to the production tree (104) when a signal is sent.

The kill wing valve (214) may be a manual gate valve that is the connection point for injection into the well (102). Fluid such as kill fluid, corrosion inhibitors, methanol, dehydration formulas, etc. may be injected into the well (102) via this valve. The production wing valve (216) may be located 180 degrees from the kill wing valve (214), as shown in FIG. 2. The production wing valve (216) may be an automatically actuated gate valve that requires positive hydraulic pressure to remain open. The production wing valve (216) may also be used to prevent flow from the well (102) under emergencies or during maintenance. The crown valve (208) provides direct vertical access to the well (102) for well interventions and may be a manually operated gate valve.

In accordance with one or more embodiments, the flow line (110) is connected to the arm of the production tree (104) having the production wing valve (216). The produced fluids may then flow from the well (102), to the production tree (104), through the production wing valve (216), and into the flow line (110). Thus, the production wing valve (216) may be open or closed to control the flow of production fluids from the well (102) into the flow line (110).

The well (102) may be located in remote locations with little existing infrastructure, and the well (102) may be part of a field (100) having a large number of wells (102). Due to the lack of infrastructure, energy conservation initiatives, and number of wells (102), tracking the operating status of each well (102) is difficult. Thus, the ability to remotely determine the operating status of a well (102) while minimizing emissions is beneficial. As such, this disclosure presents systems and methods that use a turbine, immersed in a flow of production fluids, to power a chip to send a signal indicating the operating status of the well (102). The operating status of the well indicates whether the well is ON or OFF (operational, or not).

Figure 3:
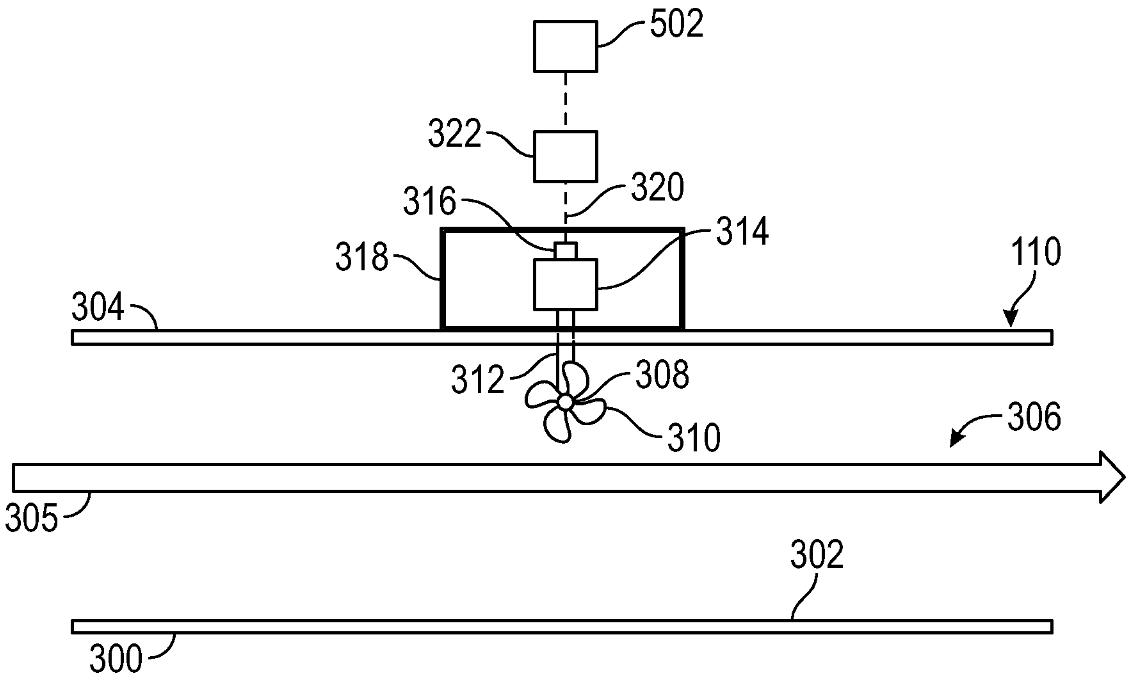
FIGS. 3 and 4 show a flow line in accordance with one or more embodiments.

FIG. 3 shows the flow line (110) in accordance with one or more embodiments. Components shown in FIG. 3 that are the same as or similar to components shown in FIGS. 1-2 have not been redescribed for purposes of readability and have the same function and description as outlined above.

In accordance with one or more embodiments, the flow line (110) is a tubular having an outer circumferential surface (300) and an inner circumferential surface (302). The material between the outer circumferential surface (300) and an inner circumferential surface (302) defines a wall (304). The wall (304) may be made out of any tubing material known in the art, such as a metal alloy. The inner circumferential surface (302) delineates a conduit (306). Produced fluids (305) may be disposed within the conduit (306). In further embodiments, the produced fluids (305) may flow through the conduit (306) of the flow line (110).

FIG. 3 shows a turbine (308) disposed within the conduit of the well (102). The turbine (308) is a device that harnesses the kinetic energy of a fluid, such as the produced fluids (305). The turbine (308) turns the kinetic energy into rotational motion of the turbine (308). In accordance with one or more embodiments, the turbine (308) may be a small rotary impeller. The turbine (308) may have any construction known in the art. For example, the turbine (308) may be a series of blades (310). The blades (310) may be made out of any material known in the art, such as steel or any strong material that resists the erosion impact. In accordance with one or more embodiments, the blades (310) spin as the produced fluids (305) flow past the turbine (308).

The turbine (308) is connected to the wall (304) of the flow line (110) using a connector (312). In accordance with one or more embodiments, the connector (312) has the ability to hold the turbine (308) in place in the flow line (110) and transport the rotational motion of the turbine (308) to an energy generator (314). In further embodiments, the energy generator (314) is located outside of the turbine (308), as shown in FIG. 3; however, the energy generator (314) may be integrated within the turbine (308) without departing from the scope of the disclosure herein. In the later scenario, the connector (312) may act as an energy transporter that transports the electrical energy, created by the energy generator (314), to a chip (316).

FIG. 3 shows the turbine (308) connected to the flow line (110) using a singular connector (312); however, any number of connectors (312) may be used to connect the turbine (308) to the flow line (110) without departing from the scope of the disclosure herein. Furthermore, the turbine (308) is shown connected to the top portion of the flow line (110); however, a person skilled in the art will readily appreciate that the turbine (308) may be installed on any location within the flow line (110), such as the bottom or sides of the inner circumferential surface (302) of the flow line (110).

FIG. 3 shows the connector (312) passing through the wall (304) of the flow line (110) into a chip box (318). In accordance with one or more embodiments, the chip box (318) is a housing connected to the outer circumferential surface (300) of the flow line (110). The chip box (318) houses a chip (316) and/or the energy generator (314). The energy generator (314) may be connected to the connector (312) such that the energy generator (314) may receive the rotational motion of the turbine (308) and turn the rotational motion into electrical energy. In other embodiments, the energy generator (314) is integrated with the turbine (308) (FIG. 4), and the connector (312) transports the electrical energy directly to the chip (316) in the chip box (318).

The energy generator (314) may turn the rotational motion into electrical energy using any generation method known in the art, such as piezoelectric energy generation. In accordance with one or more embodiments, the chip (316) is connected to the energy generator. The chip (316) uses the electrical energy to activate and send a signal (320) to a receiver (322). The receiver (322) may be part of or connected to a computer (502) such that the signal (320) may be transported to the computer (502). The signal (320) may be a Unique Identification (UI) binary digital code. The UI signal (320) may be assigned to the well (102). Thus, the computer (502) may be able to show a user which well(s) (102) are sending signals (320). The computer (502) is further outlined below in FIG. 5.

In accordance with one or more embodiments, the chip (316) may be any type of digital chip technology known in the art such as Supervisory Control and Data Acquisition technologies, Wi-Fi technologies, or Radio Frequency Identification technologies.

In accordance with one or more embodiments, the chip (316) is only able to send the signal (320) when powered by the energy generator (314). Because the energy generator (314) requires rotation of the turbine (308) to create the electrical energy, the chip (316) may only be powered when the produced fluids (305) are flowing through the flow line (110), causing the turbine (308) to rotate. As such, reception of the UI signal (320) at the receiver (322)/computer (502) enables a user to determine which well (102) is flowing. In one or more embodiments, the receiver (322) may be installed at the crude gathering stations.

In further embodiments, the receiver (322)/computer (502) may be located in the production plant (114) outlined in FIG. 1, and each flow line (110) for each well (102) may have the integrated chip (316) system as outlined in FIG. 3. Thus, when each well (102) is actively producing the produced fluids (305), the UI signal (320) is being sent to the production plant (114). A user or a computer (502) program may be able to analyze the reception of UI signals (320) to remotely and digitally track the operating status of each well (102) in the field (100). In one or more embodiments, the binary codes of the UI signal are decoded at the computer or gathering station control console, which is configured to flag the individual well status (on/off).

Figure 4:
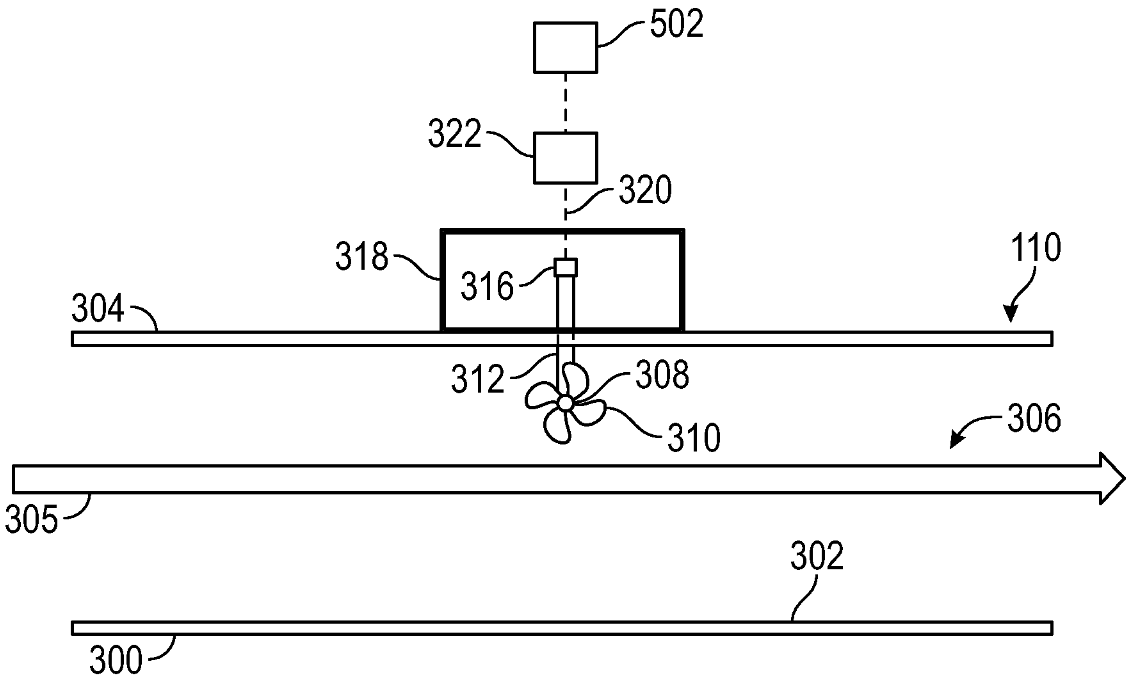

FIG. 4 shows the flow line (110) in accordance with one or more embodiments. Components shown in FIG. 4 that are the same as or similar to components shown in FIGS. 1-3 have not been redescribed for purposes of readability and have the same function and description as outlined above.

Specifically, FIG. 4 shows, in accordance with one or more embodiments, a configuration of the flow line (110) where the energy generator (314) is integrated with the turbine (308). As shown in FIG. 4, the connector (312) is connected to the chip (316) and the turbine (308), and the connector (312) transports the electrical energy from the turbine (308) to the chip (316) in the chip box (318). The energy generator (314) is not pictured in FIG. 4 as the energy generator (314) is integrated into the turbine (308).

Figure 5:
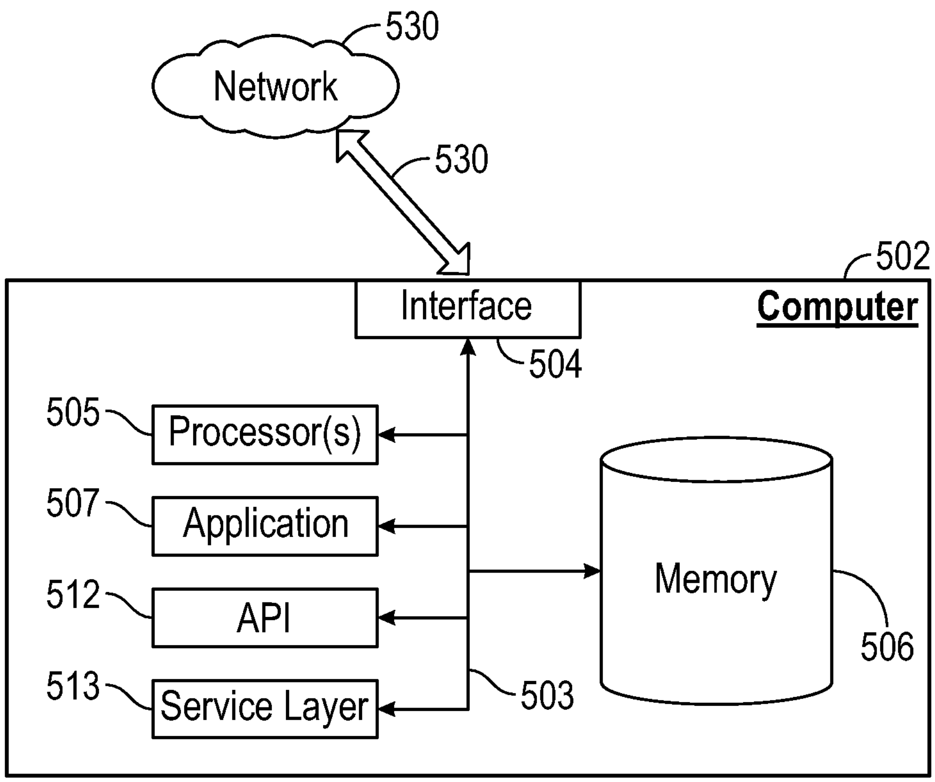
FIG. 5 shows a computer system in accordance with one or more embodiments.

FIG. 5 shows a computer (502) system in accordance with one or more embodiments. Specifically, FIG. 5 shows a block diagram of a computer (502) system used to provide computational functionalities associated with described algorithms, methods, functions, processes, flows, and procedures as described in the instant disclosure, according to an implementation. The illustrated computer (502) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device.

Additionally, the computer (502) may include a computer that includes an input device, such as a keypad, keyboard, touch screen, or other device that can accept user information, and an output device that conveys information associated with the operation of the computer (502), including digital data, visual, or audio information (or a combination of information), or a GUI.

The computer (502) can serve in a role as a client, network component, a server, a database or other persistency, or any other component (or a combination of roles) of a computer system for performing the subject matter described in the instant disclosure. The illustrated computer (502) is communicably coupled with a network (530). In some implementations, one or more components of the computer (502) may be configured to operate within environments, including cloud-computing-based, local, global, or other environment (or a combination of environments).

At a high level, the computer (502) is an electronic computing device operable to receive, transmit, process, store, or manage data and information associated with the described subject matter. According to some implementations, the computer (502) may also include or be communicably coupled with an application server, e-mail server, web server, caching server, streaming data server, business intelligence (BI) server, or other server (or a combination of servers).

The computer (502) can receive requests over network (530) from a client application (for example, executing on another computer (502)) and responding to the received requests by processing the said requests in an appropriate software application. In addition, requests may also be sent to the computer (502) from internal users (for example, from a command console or by other appropriate access method), external or third-parties, other automated applications, as well as any other appropriate entities, individuals, systems, or computers.

Each of the components of the computer (502) can communicate using a system bus (503). In some implementations, any or all of the components of the computer (502), both hardware or software (or a combination of hardware and software), may interface with each other or the interface (504) (or a combination of both) over the system bus (503) using an application programming interface (API) (512) or a service layer (513) (or a combination of the API (512) and service layer (513). The API (512) may include specifications for routines, data structures, and object classes. The API (512) may be either computer-language independent or dependent and refer to a complete interface, a single function, or even a set of APIs. The service layer (513) provides software services to the computer (502) or other components (whether or not illustrated) that are communicably coupled to the computer (502).

The functionality of the computer (502) may be accessible for all service consumers using this service layer. Software services, such as those provided by the service layer (513), provide reusable, defined business functionalities through a defined interface. For example, the interface may be software written in JAVA, C++, or other suitable language providing data in extensible markup language (XML) format or other suitable format. While illustrated as an integrated component of the computer (502), alternative implementations may illustrate the API (512) or the service layer (513) as stand-alone components in relation to other components of the computer (502) or other components (whether or not illustrated) that are communicably coupled to the computer (502). Moreover, any or all parts of the API (512) or the service layer (513) may be implemented as child or sub-modules of another software module, enterprise application, or hardware module without departing from the scope of this disclosure.

The computer (502) includes an interface (504). Although illustrated as a single interface (504) in FIG. 5, two or more interfaces (504) may be used according to particular needs, desires, or particular implementations of the computer (502). The interface (504) is used by the computer (502) for communicating with other systems in a distributed environment that are connected to the network (530). Generally, the interface (504) includes logic encoded in software or hardware (or a combination of software and hardware) and operable to communicate with the network (530). More specifically, the interface (504) may include software supporting one or more communication protocols associated with communications such that the network (530) or interface's hardware is operable to communicate physical signals within and outside of the illustrated computer (502).

The computer (502) includes at least one computer processor (505). Although illustrated as a single computer processor (505) in FIG. 5, two or more processors may be used according to particular needs, desires, or particular implementations of the computer (502). Generally, the computer processor (505) executes instructions and manipulates data to perform the operations of the computer (502) and any algorithms, methods, functions, processes, flows, and procedures as described in the instant disclosure.

The computer (502) also includes a non-transitory computer (502) readable medium, or a memory (506), that holds data for the computer (502) or other components (or a combination of both) that can be connected to the network (530). For example, memory (506) can be a database storing data consistent with this disclosure. Although illustrated as a single memory (506) in FIG. 5, two or more memories may be used according to particular needs, desires, or particular implementations of the computer (502) and the described functionality. While memory (506) is illustrated as an integral component of the computer (502), in alternative implementations, memory (506) can be external to the computer (502).

The application (507) is an algorithmic software engine providing functionality according to particular needs, desires, or particular implementations of the computer (502), particularly with respect to functionality described in this disclosure. For example, application (507) can serve as one or more components, modules, applications, etc. Further, although illustrated as a single application (507), the application (507) may be implemented as multiple applications (507) on the computer (502). In addition, although illustrated as integral to the computer (502), in alternative implementations, the application (507) can be external to the computer (502).

There may be any number of computers (502) associated with, or external to, a computer system containing computer (502), each computer (502) communicating over network (530). Further, the term "client," "user," and other appropriate terminology may be used interchangeably as appropriate without departing from the scope of this disclosure. Moreover, this disclosure contemplates that many users may use one computer (502), or that one user may use multiple computers (502).

Figure 6:
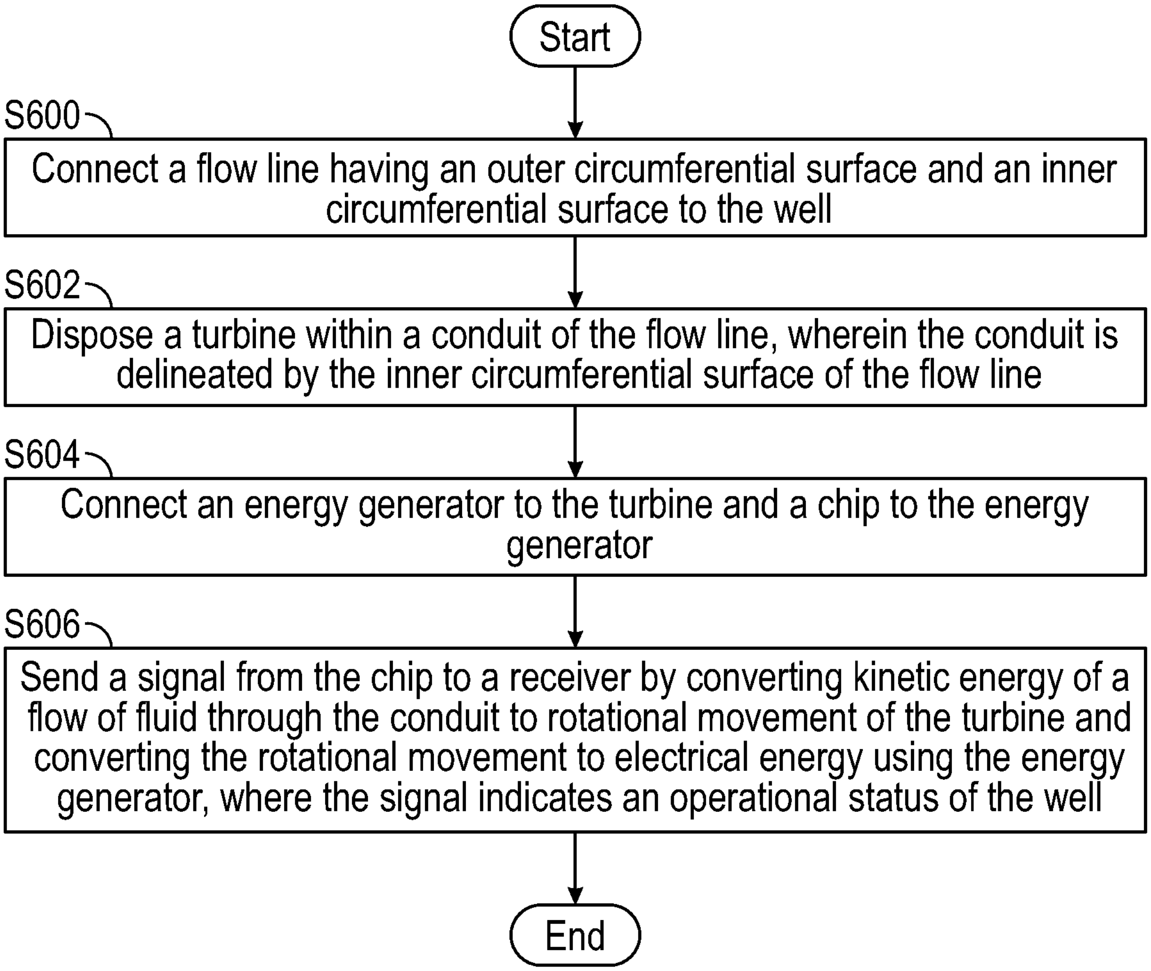
FIG. 6 shows a flowchart in accordance with one or more embodiments.

FIG. 6 shows a flowchart in accordance with one or more embodiments. The flowchart outlines a method for indicating an operational status of a well (102). As noted above, the operational status of a well may indicating whether the well is ON or OFF. While the various blocks in FIG. 6 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In S600, a flow line (110) having an outer circumferential surface (300) and an inner circumferential surface (302) is connected to the well (102). In accordance with one or more embodiments, the flow line (110) is connected to a wing of a production tree (104) capping a well (102). The flow line (110) may be connected to the wing of the production tree (104) having the production wing valve (216). When the production wing valve (216) is open, produced fluids (305) may flow from the well (102) into the flow line (110) via the production tree (104).

In S602, a turbine (308) is disposed within a conduit (306) of the flow line (110). The conduit (306) is delineated by the inner circumferential surface (302) of the flow line (110). When the produced fluids (305) flow into the conduit (306) of the flow line (110) from the production tree (104), the produced fluids (305) may cause the turbine (308) to rotate. In accordance with one or more embodiments, the turbine (308) may be connected to the flow line (110) using a connector (312). The connector (312) may extend through the wall (304) of the flow line (110) and into a chip box (318) connected to the outer circumferential surface (300) of the flow line (110).

In S604, an energy generator (314) is connected to the turbine (308) and a chip (316) is connected to the energy generator (314). In accordance with one or more embodiments, both the energy generator (314) and the chip (316) are housed in the chip box (318), as shown in FIG. 3. The connector (312) may extend from the turbine (308), through the wall (304), to be connected to the energy generator (314) in the chip box (318). Thus, the connector (312) transports the rotational movement of the turbine (308) to the energy generator (314). The chip (316) may be connected to the energy generator (314) and the chip (316) may be powered using electrical energy created by the energy generator (314) using the rotational movement.

In other embodiments, the chip (316) is housed in the chip box (318) and the energy generator (314) is integrated into the turbine (308), as shown in FIG. 4. The connector (312) may extend from the turbine (308) integrated with the energy generator (314), through the wall (304), to be connected to the chip (316) in the chip box (318). Thus, the connector (312) transports the electrical energy, created by the energy generator (314) integrated with the turbine (308), to the chip (316).

In S606, a signal (320) is wirelessly sent from the chip (316) to a receiver (322) by converting kinetic energy of a flow of fluid through the conduit (306) to rotational movement of the turbine (308) and converting the rotational movement to electrical energy using the energy generator (314). The signal (320) indicates an operational status of the well (102). In accordance with one or more embodiments, the produced fluids (305) flow from the well (102) to the flow line (110) using the production tree (104).

The flow of the produced fluids (305) causes the turbine (308) to rotate. In one or more embodiments, the turbine only rotates when the fluid passes through it and will stop upon no flow condition. The energy generator (314) converts the rotational movement of the turbine (308) into electrical energy. In further embodiments, the energy generator (314) converts the rotational movement of the turbine (308) into electrical energy using piezoelectric energy generation methods. The electrical energy is transported to the chip (316) to power the chip (316) and allow the chip (316) to emit a signal (320).

The signal (320) may be received at a receiver (322). The receiver (322) may be located at a production plant (114) or a crude gathering station. The receiver (322) may be integrated with or be connected to a computer (502). A computer (502) program or a user may see reception of the signal (320) as an operational indicator of the well (102). That is, the computer (502) should only receive the signal (320) if the well (102) is flowing. Thus, the operational status is one of the following: the well (102) is flowing or the well (102) is not flowing. In further embodiments, multiple flow lines (110) of multiple wells (102) may have the chip (316)—turbine (308) system installed allowing a computer (502) or operator to remotely view the operational status of multiple wells (102) at a time.

Advantageously, embodiments disclosed herein provide the capability to accurately monitor a well flowing status without a physical visit to the wells. Also, the (on/off) status of the well is utilized to accurately perform the crude/well allocation and other important production engineering monitoring and tracking. The proposed system quickly and accurately reflects the wells' operating status (on/off), eliminate the human interference aspect of determining the status of the well, and improve the allocated volumetric hydrocarbon production data. In addition, this arrangement is not only helpful in knowing the status of well flow but is also used as an energy conservation initiative which is required to power the arrangement. The turbine acts as energy harvesting tool/generator and hence the system does not need to be supplied with external energy. This saves costly power transmission to a remote location.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A system for a well, the system comprising:

a flow line having an outer circumferential surface and an inner circumferential surface and connected to the well;

a conduit delineated by the inner circumferential surface of the flow line;

a turbine disposed in the conduit of the flow line and configured to convert kinetic energy of a fluid, flowing from the well through the conduit, to rotational movement;

an energy generator connected to the turbine via a connector and configured to convert the rotational movement to electrical energy, wherein the connector passes through a wall of the flow line; and a chip connected to the energy generator and configured to use the electrical energy created by the energy generator to send a signal indicating an operational status of the well to a receiver, wherein the operational status indicates whether the well is operational or non-operational, wherein, in response to the well being operational, the turbine is rotated by fluid flowing through the conduit and the chip is powered by the electrical energy converted from the turbine as the fluid flows through the conduit, where the powered chip indicates the operational status is operational, and wherein in response to the well being non-operational, fluid does not flow through the conduit, the turbine is stationary, and the chip is not powered by the turbine, where the non-powered chip indicates the operational status is non-operational.

2. The system of claim 1, further comprising a chip box connected to the outer circumferential surface of the flow line.

3. The system of claim 2, wherein the chip box houses the chip.

4. The system of claim 2, wherein the energy generator is housed in the chip box.

5. The system of claim 1, wherein the connector is configured to transport the rotational movement of the turbine to the energy generator.

6. The system of claim 1, wherein the energy generator further comprises a piezoelectric energy generator.

7. The system of claim 1, wherein the flow line is connected to a production tree capping the well.

8. A method for a well, the method comprising:

connecting a flow line having an outer circumferential surface and an inner circumferential surface to the well;

disposing a turbine within a conduit of the flow line, wherein the conduit is delineated by the inner circumferential surface of the flow line;

connecting an energy generator to the turbine via a connector and a chip to the energy generator, wherein the connector passes through a wall of the flow line; and sending a signal from the chip to a receiver by converting kinetic energy of a flow of fluid through the conduit to rotational movement of the turbine and converting the rotational movement to electrical energy using the energy generator, wherein the signal indicates an operational status of the well, wherein the operational status indicates whether the well is operational or non-operational, wherein, in response to the well being operational, the chip is powered by the electrical energy converted from the turbine as the fluid flows through the conduit, where the powered chip indicates the operational status is operational, and wherein in response to the well being non-operational, the chip is not powered by the turbine, where the non-powered chip indicates the operational status is non-operational.

9. The method of claim 8, further comprising connecting a chip box to the outer circumferential surface of the flow line.

10. The method of claim 9, wherein connecting the chip to the energy generator further comprises housing the chip in the chip box.

11. The method of claim 10, wherein the disposing a turbine within a conduit of the flow line further comprises connecting the turbine to the flow line using the connector.

12. The method of claim 11, wherein connecting the energy generator to the turbine further comprises housing the energy generator in the chip box.

13. The method of claim 8, wherein converting the rotational movement to electrical energy further comprises transporting the rotational movement of the turbine to the energy generator using the connector.

14. The method of claim 8, wherein connecting the flow line having an outer circumferential surface and an inner circumferential surface to the well comprises connecting the flow line to a production tree disposed on the well.

15. A pipeline system comprising:

a plurality of wells spaced apart about a geographical location, each well of the plurality of wells comprising:

a unique identification binary digital code;

a flow line having an outer circumferential surface and an inner circumferential surface and connected to the well;

a conduit delineated by the inner circumferential surface of the flow line;

a turbine disposed in the conduit of the flow line and configured to convert kinetic energy of a fluid, flowing from the well through the conduit, to rotational movement;

an energy generator connected to the turbine via a connector and configured to convert the rotational movement to electrical energy, wherein the connector passes through a wall of the flow line; and a chip connected to the energy generator and configured to use the electrical energy created by the energy generator to send a signal indicating an operational status of the well to a receiver, wherein the operational status indicates whether the well is operational or non-operational, wherein, in response to the well being operational, the turbine is rotated by fluid flowing through the conduit and the chip is powered by the electrical energy converted from the turbine as the fluid flows through the conduit, where the powered chip indicates the operational status is operational, wherein, in response to the well being non-operational, fluid does not flow through the conduit, the turbine is stationary, and the chip is not powered by the turbine, where the non-powered chip indicates the operational status is non-operational.

16. The pipeline system of claim 15, wherein the flow line is connected to a production tree located on the well.

* * * * *